Figure 6:
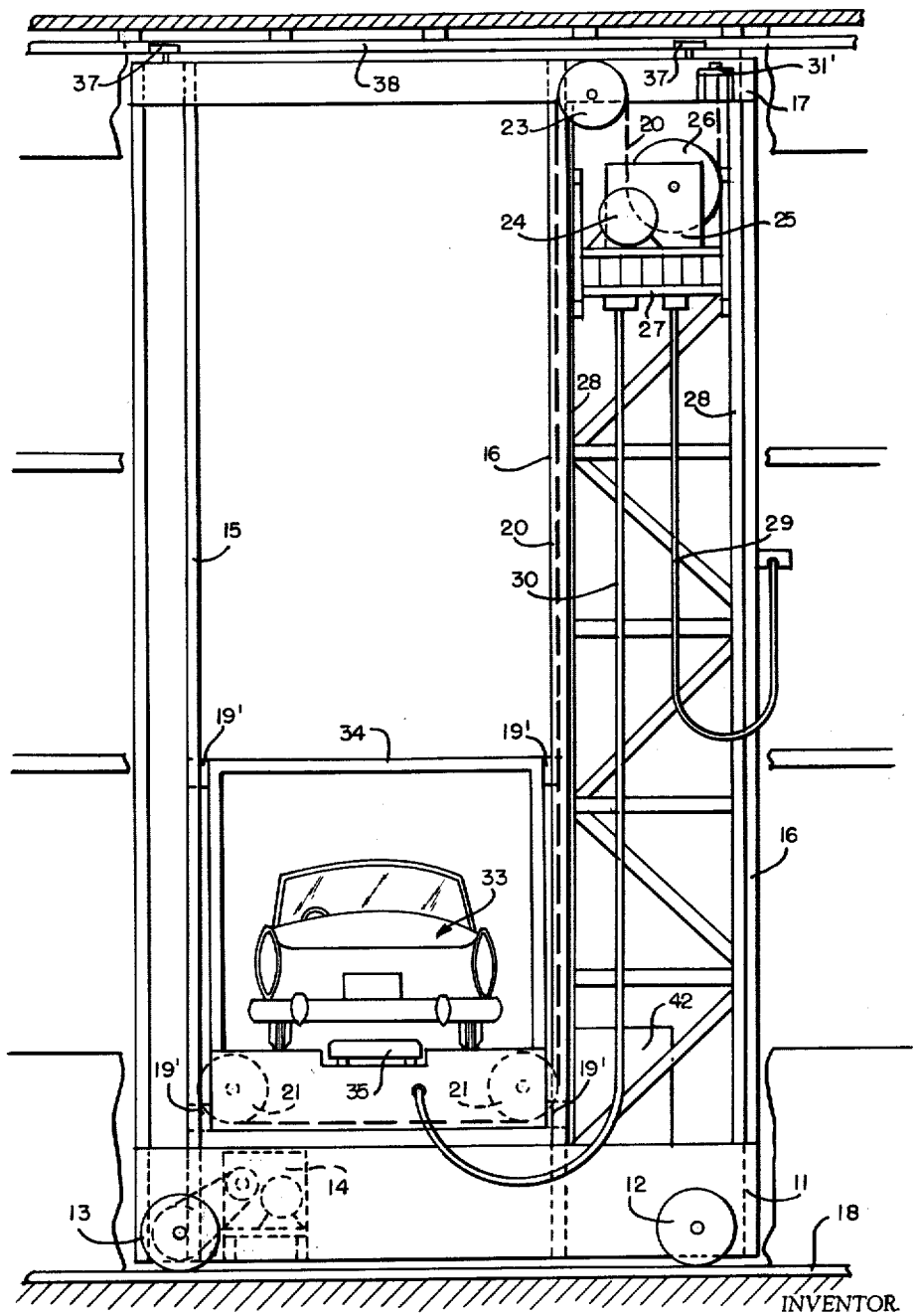

Aug. 20, 1963   E. G. BIANCA   3,101,130
ELEVATOR SYSTEM IN WHICH DRIVE MECHANISM
IS MOUNTED UPON THE COUNTERWEIGHT
Filed Oct. 6, 1961   6 Sheets-Sheet 1
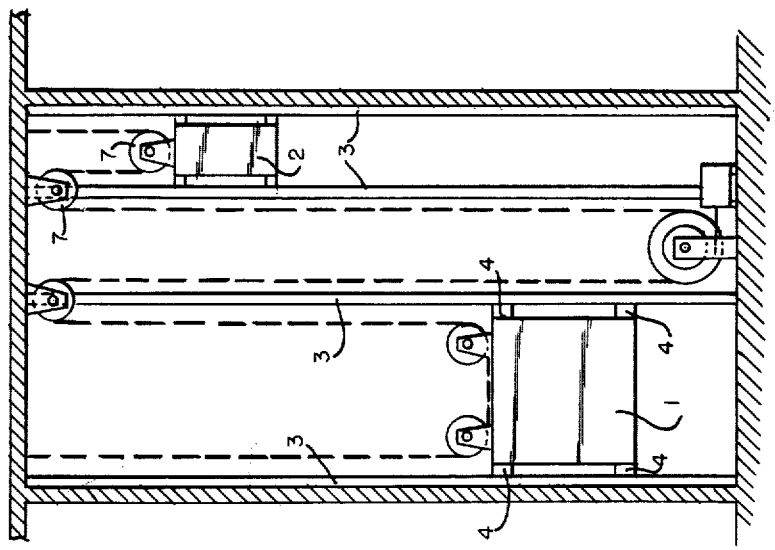
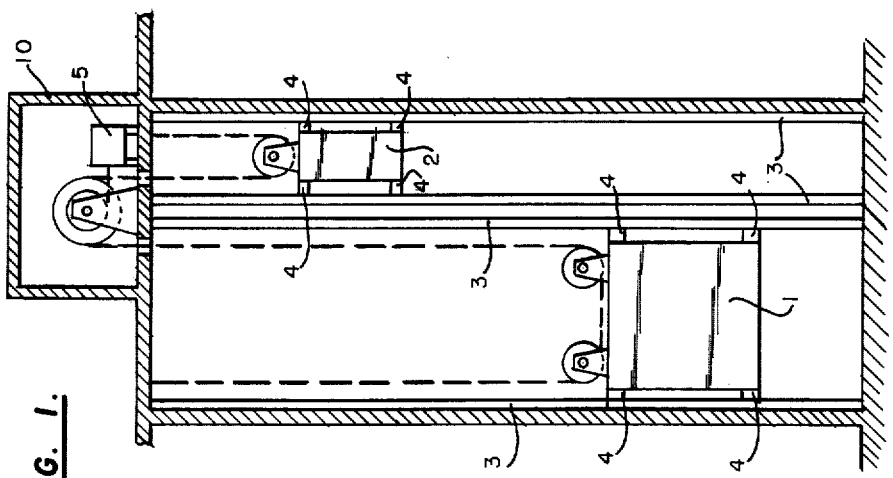
INVENTOR.
Edoardo G. Bianca
BY
Abraham A. Saffitz
ATTORNEY

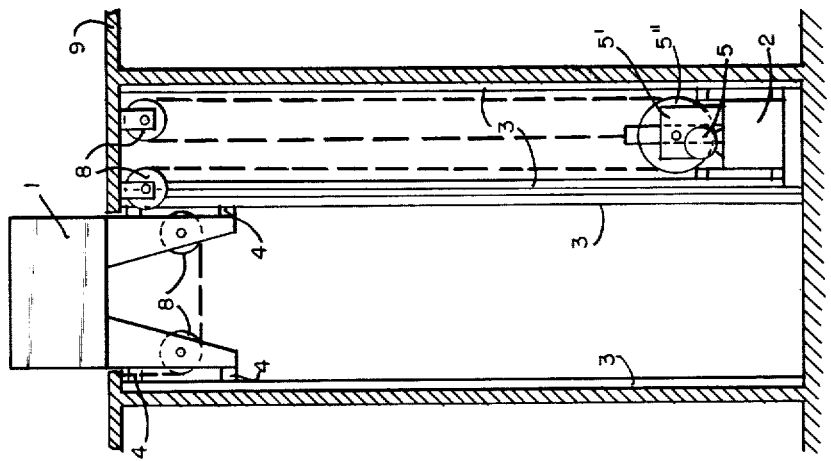
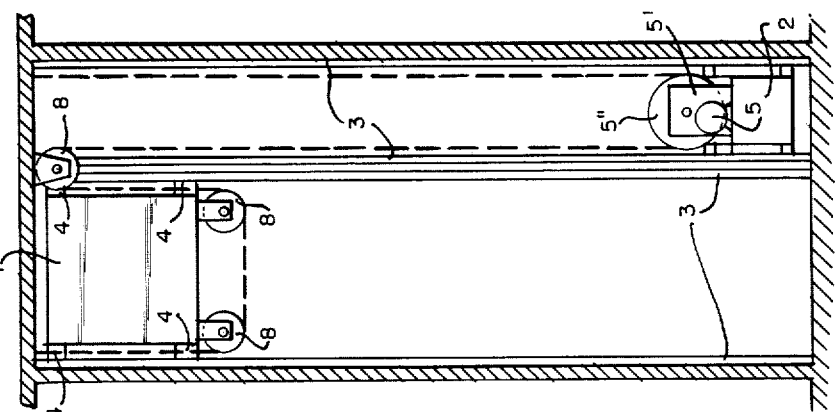
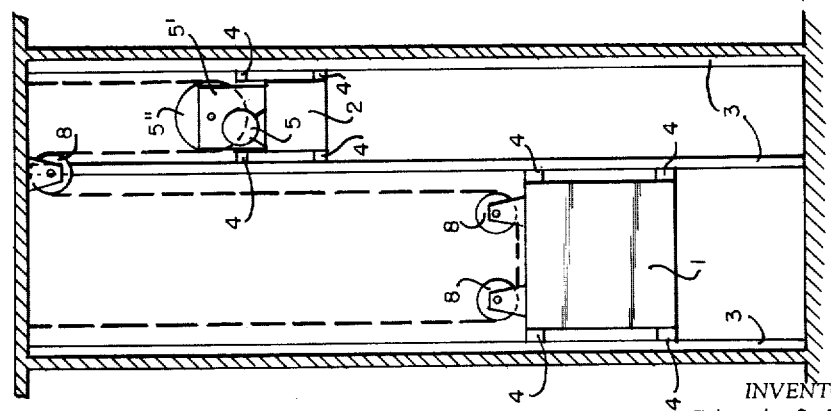

INVENTOR.
Edoardo G. Bianca
ATTORNEY

Aug. 20, 1963

E. G. BIANCA 3,101,130

ELEVATOR SYSTEM IN WHICH DRIVE MECHANISM
IS MOUNTED UPON THE COUNTERWEIGHT

Filed Oct. 6, 1961

6 Sheets-Sheet 4

INVENTOR.
Edoardo G. Bianca
BY
*Abraham A. Saffitz*
ATTORNEY

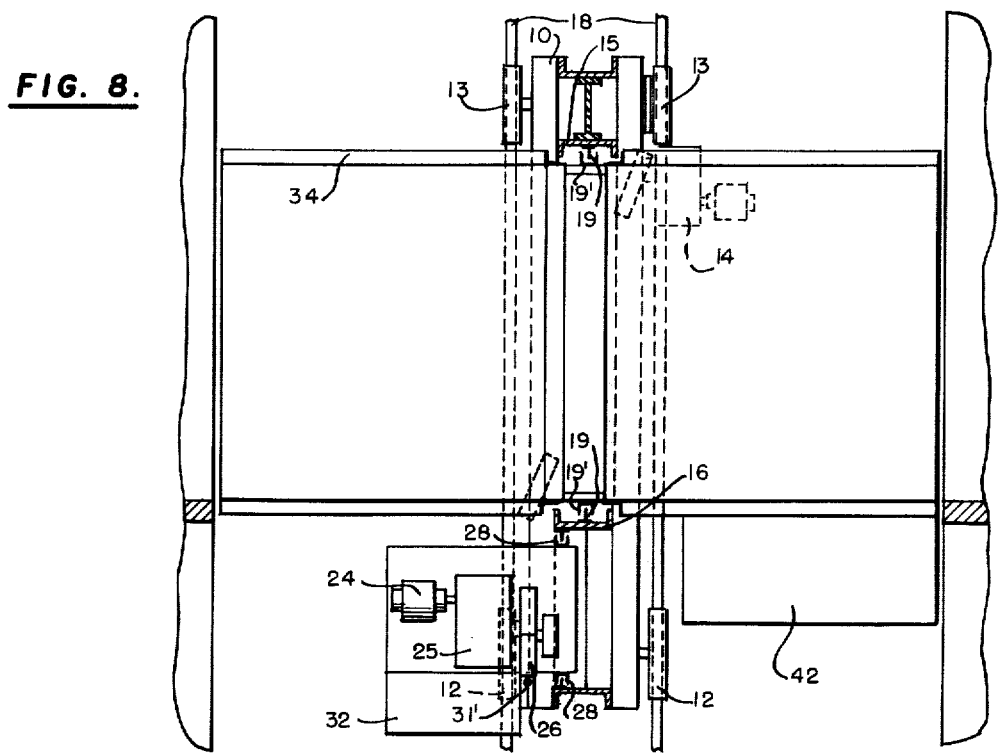
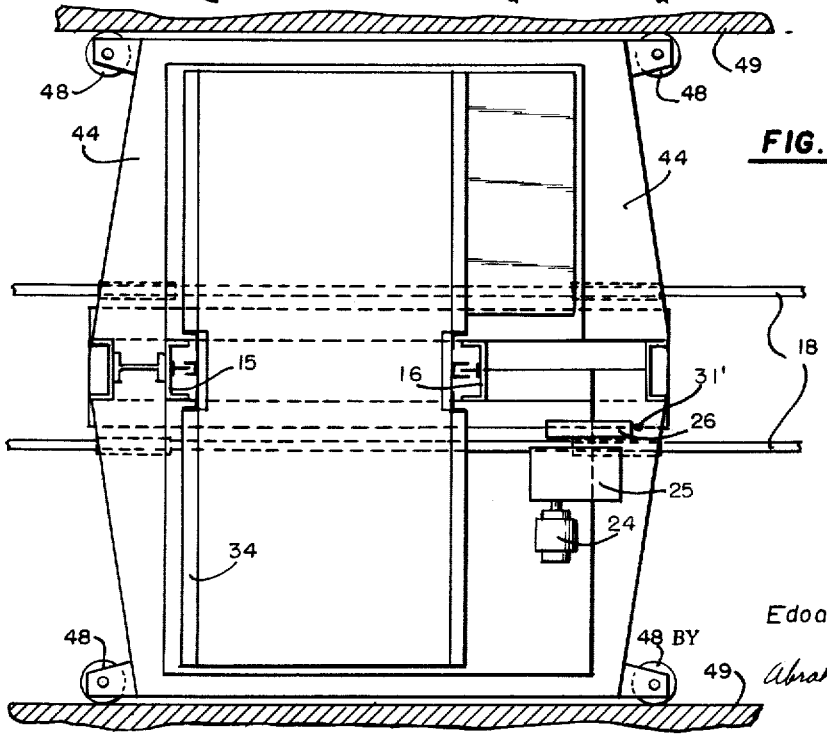

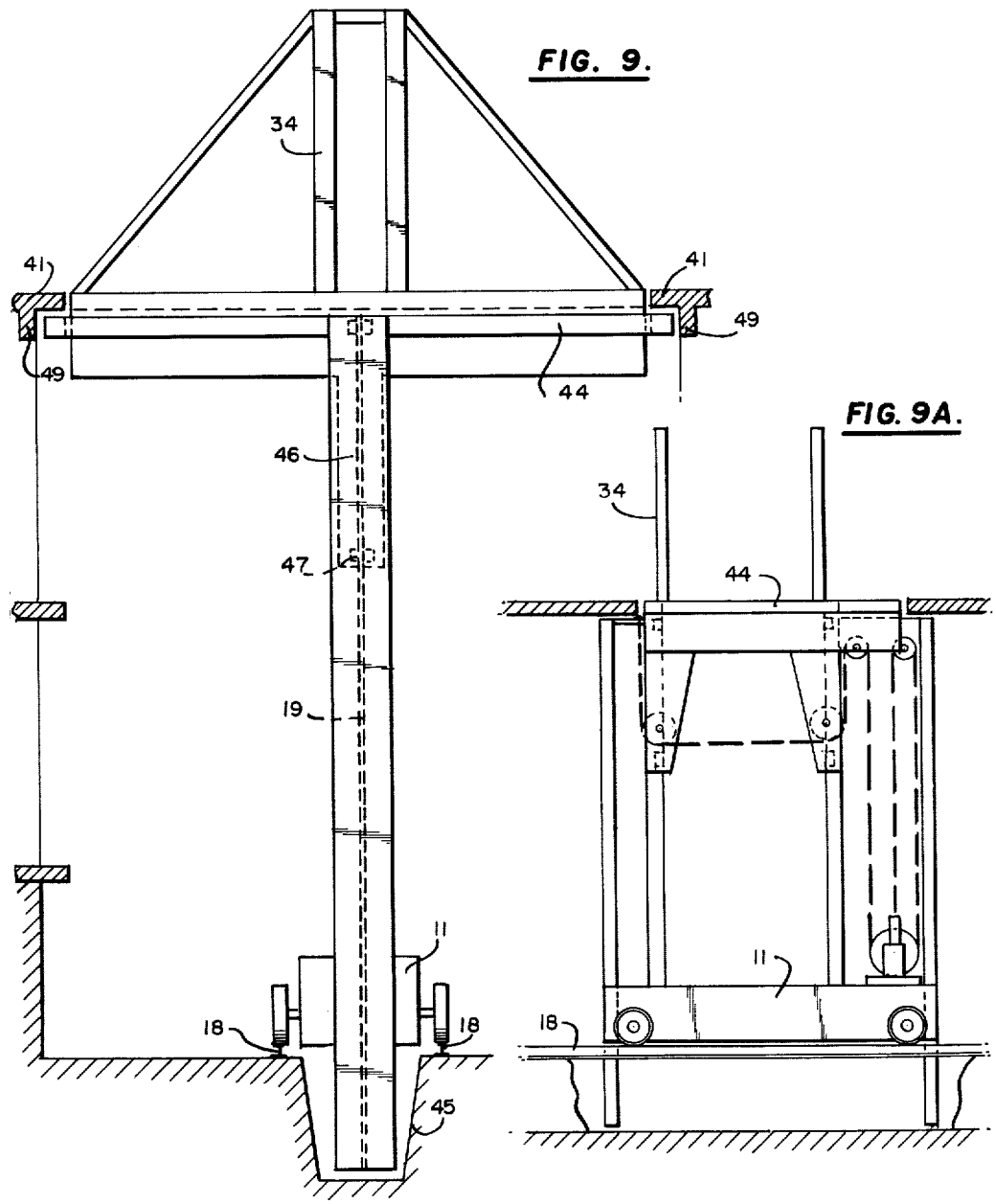

United States Patent Office 3,101,130
Patented Aug. 20, 1963

3,101,130
ELEVATOR SYSTEM IN WHICH DRIVE MECHANISM IS MOUNTED UPON THE COUNTERWEIGHT
Edoardo Giuseppe Bianca, Zollikon, near Zurich, Switzerland, assignor to Silopark S.A., St. Moritz, Switzerland, a Swiss firm
Filed Oct. 6, 1961, Ser. No. 143,328
Claims priority, application Austria Oct. 12, 1960
5 Claims. (Cl. 187—20)

The present invention relates to a lift arrangement, especially for garage buildings.

In the known lift arrangements with friction drive to the suspension cables and with loose rollers the arrangement of the drive engine and drive pulley above the drive shaft is preferred (FIGURE 1), since the preferred known arrangement embodies the minimum number of cable reversals and results in the minimum cable wear and the maximum efficiency being achieved thereby. This however necessitates placing the machinery housing above the uppermost position of the lift cage, so that either the top floor cannot be served or a super-structure of several floors must be tolerated.

This can be avoided according to the prior art only by the fact that the drive machinery is arranged at the bottom (FIGURE 2), but the above-mentioned disadvantages occur with regard to cable reversals, cable wear, efficiency and also the lateral space requirements which are difficult to meet in expensive commercial property.

The present invention has the purpose of achieving the advantages of both of the aforesaid lift arrangements, without the corresponding disadvantages thereof and the present lift arrangement comprises a lift drive assembly, consisting of drive pulley, gears, brake, engine, foundation frame and the pertinent accessories which are united in a novel manner with the lift counterweight and forms a part thereof, the drive pulley at the same time fulfilling the double function of the cable drive and of a suspension roller of the counter-weight.

As a result of the new structure of the invention (FIGURE 3) a substantial simplification and reduction of the cable guidance is achieved, in that two complete cable loops with the pertinent pulleys, spindles and bearings are omitted, so that the efficiency is substantially increased and the cable wear is reduced. Furthermore there is no need for the shaft to extend beyond the uppermost story, or the uppermost story can be used without super-structure, and the lateral space requirements are less than in the arrangements according to FIGURE 2. Furthermore according to the arrangement as shown in FIGURE 4 it is possible to utilize the lift cage space to the full height of the uppermost story and according to FIGURE 5 even without any additional arrangements to take the cage through an opening in the roof for a further story.

Still further advantages apart from those mentioned are presented by the invention in the case of mobile lifts, especially in horizontally mobile lift towers for filling the cells in mechanical garages. Here the weight of the complete drive assembly with accessories, electrical equipment and foundation frame, which in lifts for garage buildings usually lies in the order of magnitude of at least 2 to 2½ tons, is itself used as counter-weight. Since the necessary counter-weight in such lifts is in the order of magnitude of 4 to 4½ tons, the frame thereof weighing about 1 ton, only a small quantity of dead weight needs to be applied for compensation purposes, signifying a substantial reduction of the mobile masses, apart from savings of space and expense.

Figure 7:
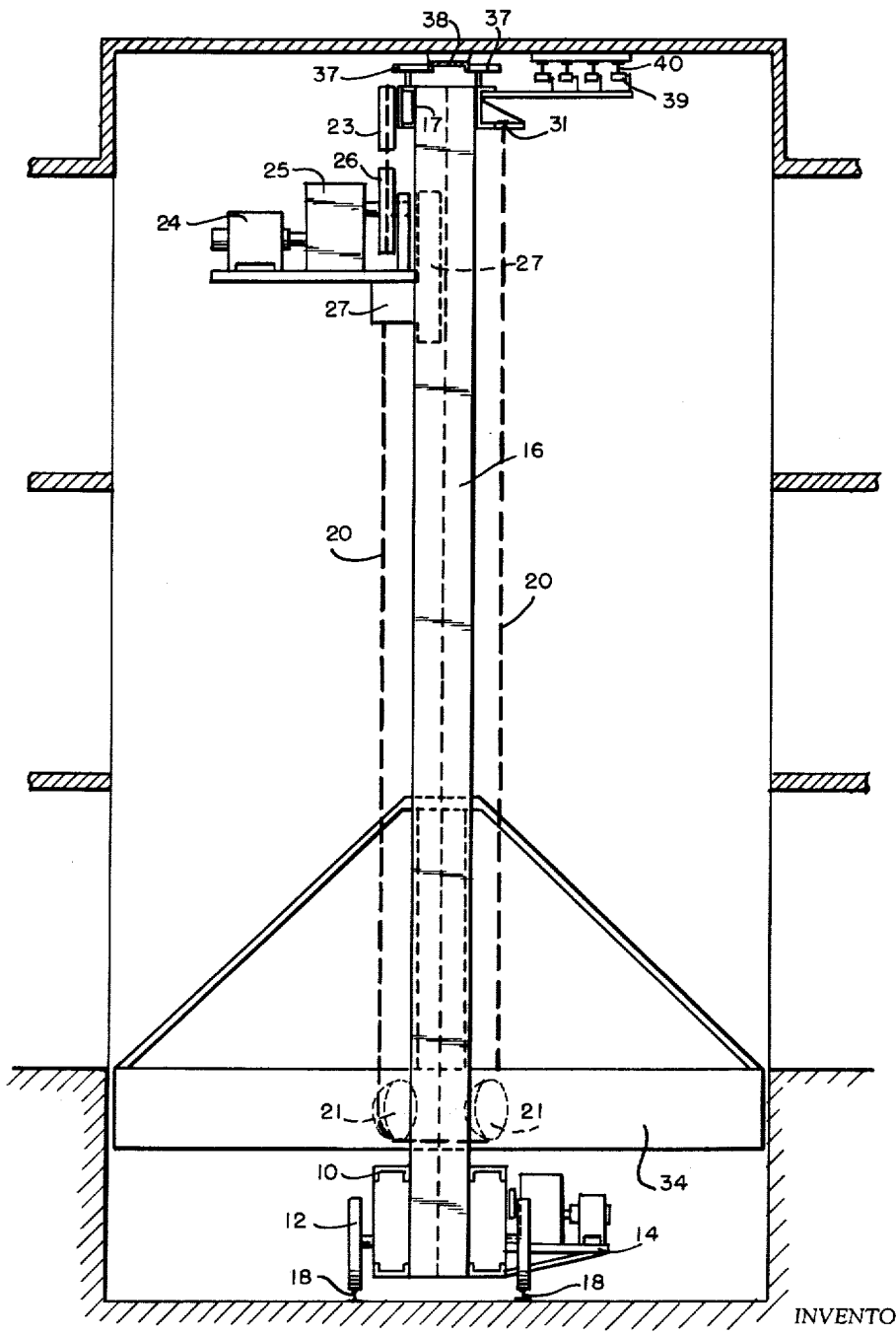

According to a preferred form of embodiment, as shown in FIGURES 6, 7 and 8, the cage and the lift counterweight are arranged in a horizontally movable carriage which possesses two support masts which are provided with vertical guide rails and one of which is reinforced, between which there is guided a lift cabin, and which are connected at their upper ends by a frame element and guided by rollers or the like on a rail. Due to this construction of the carriage as open central frame, which represents if not the only then at least by far the best solution for the arrangement of the drive assembly in the counter-weight, a significant reduction of the material, cost of material and of the weight is achieved in comparison with the hitherto usual cage-like structure of the mobile towers. Prior mobile garage lift towers had weights of about 40 tons, which greatly complicates the problems of propulsion as a result of the great weight to be accelerated and braked, especially in view of the requisite high accuracy of stopping, while the construction is light in weight according to the invention and cuts the cost of manufacture or installation to about half. The construction of the invention has a weight of the mobile structure including the lift which is reduced by 30 to 40% which results in cheaper operating costs.

The division of the two support masts into a stronger and a weaker mast has the advantage that the requisite rigidity of the installation is achieved with a low construction and material expense, based upon the fact that the entire horizontal acceleration forces are taken up exclusively by the reinforced mast, which together with the carriage forms a rigid L-shaped structural element. The second, weaker mast has only to take up the mass forces of the lift cabin, which amount to only a small part, at the most up to ¼, of the entire mobile tower weight.

Examples of application of the invention are illustrated in FIGURES 3 to 5, which for the sake of pointing out the distinctive features of the present construction is illustrated in lateral elevation which is similar to the lateral elevation employed for illustration of the conventional lift arrangements which are shown in FIGURES 1 and 2. In the figures in the drawings, 1 designates the lift cage, and 2 the counter-weight, both of which are guided in guides 3 by means of guide shoes 4 in their vertical axis. The drive assembly 5 is arranged in FIGURE 1 above the uppermost story and in FIGURE 2 the drive assembly is placed laterally beneath the cage. Both the machinery house 10 situated at the top and also the additional reversing pulleys 7 with corresponding cable reversals which are shown in FIGURES 1 and 2 for the conventional construction are omitted according to the concept of the present invention, and these aforesaid features are not shown in FIGURES 3 and 4. In FIGURES 3 and 4 only three reversing rollers 8 are shown according to the size of the installation and with a smaller size two reversing rollers may be all that are necessary. More especially FIGURE 4 shows how the uppermost story can be served completely without technical extra expense by the cage 1.

FIGURE 5 shows a further example of the use of the invention, where the cage 1 can be lifted out beyond the uppermost story or ceiling 9, without extra space being needed for the mechanical drive of the lift, either in height or in depth whereby savings are achieved through eliminating cable pulleys and reversals.

FIGURES 6, 7 and 8 represent one preferred embodiment of the present invention. FIGURES 9, 9A and 10 represent another embodiment of the invention. In all of these FIGURES, 6–10, the form of the embodiments comprise a horizontally mobile lift, wherein the lift cage and the drive assembly united with the lift weight are arranged in an open, horizontally mobile frame. In FIGURE 6 the carriage is designated by 11, the carriage being provided with pairs of wheels 12, 13 which run on rails 18 in the longitudinal direction of the shaft. For supplying the drive there is provided the usual driving means consisting of a motor and gearing 14, which are assembled in the usual fashion.

On the carriage 11 there are secured two guide masts 15 and 16 each of which serves a separate function, the one mast 15 serving alone for the guidance of the lift while the other mast 16 takes up the force of the counter-weight, drive mechanism and the lift, and accordingly mast 16 is made wider than mast 15. It is possible to develop structural heights up to 6 stories and entire resistance moment due to the mass acceleration during movement is taken up entirely by means of the very stout mast 16 which is reinforced in lattice fashion. As shown in FIGURE 6, 17 represents the upper connection of the two guide masts 15 and 16.

On the guide masts 15 and 16 there are secured rails 19 on which a lift cabin 34 is guided, which can be equipped with a mechanical gripper carriage 35 serving for conveying the motor cars 33 into and from the cabin. The rail 19 is provided with guide elements 19' which can take the form of either slide shoes or rollers.

For the suspension of the cabin there are provided cables 20 which are anchored at one end in the upper frame part in an abutment 31', looped round the support pulleys 21 of the cabin 34, are guided up, reversed over the reversing pulley 23, then looped round the drive pulley 26 and are guided up again to the frame connection 17 and anchored at the point 31'.

The counter-weight consists of a frame on which there are secured a motor 24, a gearing 25 and the drive pulley 26. Furthermore space is provided for the reception of a compensating weight 27. 32 designates a small platform so that necessary supervision and adjustments can be made by maintenance personnel during operation. In this manner the drive pulley serves both for the drive of the lift and also for the suspension of the counter-weight, of which it is an integral component. The counter-weight is guided in the guide rails 28 secured on the guide mast 16, these also serving for the taking up of the reaction moment of the drive. This reaction moment can however also be taken up by special elements, preferably rollers.

The current supply takes place through a suspended cable 29 to the machine assembly in the counter-weight, which again is connected through a second suspended cable 30 with the lift cabin, in order to produce the necessary connections for the control of the lift, which is effected from the driving position 42 (FIGURE 8).

In FIGURE 7 there is shown a lateral elevation rotated through 90° in relation to FIGURE 6. Apart from the elements already described, FIGURE 7 shows the lateral guide rail 38 on the upper part of the building and shows the arrangement of the guide rollers 37. The current conducting wires or rails 40 and the corresponding current pick-ups 39 which are employed in the usual style of construction are also illustrated in FIGURE 7.

FIGURE 8 illustrates the elements above mentioned, and shows the control position 42 with the cable guidance arranged obliquely in plan view. As shown in FIGURE 8 the anchoring points of the cables are situated on two different sides of the central vertical plane of the shaft whereby a central arrangement of the guide elements is made possible, without causing undesirable tilting moments to occur in the suspension.

In the further embodiment of FIGURES 9 and 10, the upper frame beam 17 is not guided transversely over the lift cabin, but forms a rectangle 44 which permits passage for the cabin 34. Furthermore the guides 19 with the pertinent U-girders are conducted through the carriage 11 into and beneath a trough 45 situated between the rails 18. Accordingly the frame of the lift cabin 46 is guided lower by the same length in the position corresponding to the guides. The upper guides 19' are eliminated and replaced by guides on the lower end of the cabin extension 47. At the same time the reversing pulley 23 is lifted to the highest point of the framework. The lateral stabilisation is effected in this case by rollers 48, which run along on two rails 49 corresponding to the upper frame part and arranged each on one side of the shaft.

Since in this case the lifting height available for the counter-weight is less by one story than the lifting height of the lift cabin, the suspension of the counterweight is divided once more than that of the lift. Thus normally the ratio of the lifting heights and also of the vertical speeds is 3:2 for lift and counter-weight respectively. Structurally thus only one further reversing pulley is needed at the upper end of the framework and the cable on the counter-weight side is reversed downwards again on the upper side of the frame and anchored on the counter-weight frame itself.

In this manner the cabin can be lifted by its internal height or somewhat more beyond the upper end of the framework. This fulfills the special purpose, which is important in specific cases, that in those cases where the lift shaft cannot be taken through over the entire height (especially in underground installations), the lift frame must end beneath the floor 41. In this manner the full height must be available for the shaft only at the entry and exit point, while laterally the shaft is one story lower. Thus in the case of underground garages better possibilities are provided for exploitation of the space.

What I claim is:

1. A lift arrangement with cable suspension and counterweight balancing, characterised in that the lift drive assembly, consisting of motor, gearing, brake, drive pulley and the associated accessories is united with the lift counter-weight and forms a part thereof, the drive pulley at the same time carrying out the double function of the cable drive and of a suspension pulley of the counter-weight.

2. A lift arrangement with cable suspension and counterweight balancing, characterized in that the lift drive assembly, consisting of motor, gearing, brake, drive pulley and the associated accessories is united with the lift counterweight and forms a part thereof, the drive pulley at the same time carrying out the double function of the cable drive and of a suspension pulley as the counter-weight, and further characterised in that the travel of the counter-weight is shorter than the travel of the cage in the same time.

3. A lift arrangement as claimed in claim 2, especially for garage buildings, characterised in that the cage and counter-weight are arranged in a horizontally mobile carriage, which possesses two support masts provided with vertical guide rails, one of which is reinforced, between which masts there is guided a lift cabin and which masts are connected at their upper ends by a frame element and guided by rollers or the like on a rail.

4. A lift arrangement as claimed in claim 3, characterised in that the counter-weight containing the lift drive ised in that the upper frame part connecting the two masts elements is arranged and guided on the stouter of the two vertical frame elements.

5. A lift arrangement as claimed in claim 4, characteris made annular, permitting passage of the contour of the cabin, and the guide elements of the cabin are extended so far downwards that the cabin can be lifted out beyond the upper framework end by at least the clear height of the cabin.

References Cited in the file of this patent

UNITED STATES PATENTS

| | | |
|---|---|---|
| 1,554,584 | Lake | Sept. 22, 1925 |
| 1,779,998 | Beecher et al. | Oct. 28, 1930 |
| 2,626,065 | Sanders et al. | Jan. 20, 1953 |
| 2,650,728 | Goodwyn | Sept. 1, 1953 |
| 2,663,436 | Bowser | Dec. 22, 1953 |
| 2,816,624 | Asheim et al. | Dec. 17, 1957 |
| 2,824,654 | Baume | Feb. 25, 1958 |

FOREIGN PATENTS

| | | |
|---|---|---|
| 123,635 | Germany | Sept. 9, 1901 |

UNITED STATES PATENT OFFICE
CERTIFICATE OF CORRECTION

Patent No. 3,101,130            August 20, 1963

Edoardo Giuseppe Bianca

It is hereby certified that error appears in the above numbered patent requiring correction and that the said Letters Patent should read as corrected below.

Column 4, line 66, strike out "ised in that the upper frame part connecting the two masts" and insert the same after "character--" in line 70, same column 4.

Signed and sealed this 16th day of June 1964.

(SEAL)
Attest:

ERNEST W. SWIDER
Attesting Officer

EDWARD J. BRENNER
Commissioner of Patents